(12) United States Patent
Wolf et al.

(10) Patent No.: US 11,488,419 B2
(45) Date of Patent: Nov. 1, 2022

(54) IDENTITY AND LIVENESS VERIFICATION

(71) Applicant: Accenture Global Solutions Limited, Dublin (IE)

(72) Inventors: Jeffrey James Wolf, Columbus, OH (US); Michael James Smith, Canal Winchester, OH (US); Christopher J. McClellan, Grove City, OH (US); Matthew Francis Keller, Columbus, OH (US); Evan Robert Thompson, Groveport, OH (US); Johnathan David MacGregor, Columbus, OH (US)

(73) Assignee: Accenture Global Solutions Limited, Dublin (IE)

( * ) Notice: Subject to any disclaimer, the term of this patent is extended or adjusted under 35 U.S.C. 154(b) by 56 days.

(21) Appl. No.: 17/179,693

(22) Filed: Feb. 19, 2021

(65) Prior Publication Data
US 2021/0264183 A1   Aug. 26, 2021

Related U.S. Application Data

(60) Provisional application No. 62/979,641, filed on Feb. 21, 2020.

(51) Int. Cl.
*G06K 9/36* (2006.01)
*G06K 9/62* (2022.01)
(Continued)

(52) U.S. Cl.
CPC ............ *G06V 40/45* (2022.01); *G06T 7/50* (2017.01); *G06V 40/166* (2022.01);
(Continued)

(58) Field of Classification Search
CPC .... G06V 40/16–40/179; G06V 40/178; G06V 40/40–40/45; G06T 7/50–7/596;
(Continued)

(56) References Cited

U.S. PATENT DOCUMENTS 5,086,817 A  2/1992 Murphy
5,722,526 A  3/1998 Sharrard
(Continued)

FOREIGN PATENT DOCUMENTS

BR  102012017010  7/2013
CA  2782071  6/2020
(Continued)

OTHER PUBLICATIONS

EP Search Report in European Appln. No. 21157867.9, dated Jul. 19, 2021, 9 pages.
(Continued)

*Primary Examiner* — Brian Werner
(74) *Attorney, Agent, or Firm* — Fish & Richardson P.C.

(57) ABSTRACT

Implementations of the present disclosure include receiving a color image and an IR image, the IR image taken contemporaneously with the color image, providing a set of facial landmarks depicted in the color image, determining a depth value for each facial landmark in the set of color landmarks, depth values being provided from the IR image, determining an average depth difference based on at least a sub-set of facial landmarks in the set of facial landmarks, comparing the average depth difference to a difference threshold to provide a comparison, and selectively authenticating the person based on the comparison.

30 Claims, 4 Drawing Sheets

(51) Int. Cl.
  *G06V 40/40* (2022.01)
  *G06T 7/50* (2017.01)
  *G06V 40/16* (2022.01)

(52) U.S. Cl.
  CPC .......... *G06V 40/171* (2022.01); *G06V 40/172* (2022.01); *G06T 2207/10024* (2013.01); *G06T 2207/10048* (2013.01); *G06T 2207/30201* (2013.01); *G06V 40/178* (2022.01)

(58) Field of Classification Search
  CPC ............. G06T 2207/10024; G06T 7/90; G06T 2207/10048; G06T 2207/30201
  See application file for complete search history.

(56) References Cited

U.S. PATENT DOCUMENTS

| | | | |
|---|---|---|---|
| 6,109,524 | A | 8/2000 | Kanoh et al. |
| 6,173,068 | B1 | 1/2001 | Prokoski |
| 6,711,465 | B2 | 3/2004 | Tomassi |
| 7,263,220 | B2 | 8/2007 | Crandall et al. |
| 7,529,411 | B2 | 5/2009 | Haupt et al. |
| 8,290,281 | B2 | 10/2012 | Xiao |
| 8,331,632 | B1 | 12/2012 | Mohanty et al. |
| 8,355,530 | B2 | 1/2013 | Park et al. |
| 8,582,835 | B2 | 11/2013 | Cavallini |
| 8,655,732 | B1 | 2/2014 | Wilinski et al. |
| 8,848,986 | B2 | 9/2014 | Cavallini |
| 8,958,607 | B2 | 2/2015 | Juveneton et al. |
| 9,076,030 | B2 | 7/2015 | Cavallini |
| 9,135,621 | B2 | 9/2015 | Fisher et al. |
| 9,154,727 | B2 | 10/2015 | Sato et al. |
| 9,202,121 | B2 | 12/2015 | Cavallini |
| 9,430,709 | B2 | 8/2016 | Juveneton et al. |
| 9,639,769 | B2 | 5/2017 | Juveneton et al. |
| 10,252,900 | B2 | 4/2019 | Cook |
| 10,726,246 | B1 | 7/2020 | McClellan et al. |
| 10,947,103 | B2 | 3/2021 | Gant et al. |
| 10,988,365 | B2 | 4/2021 | Gant et al. |
| 2002/0087413 | A1 | 7/2002 | Mahaffy et al. |
| 2002/0132663 | A1 | 9/2002 | Cumbers |
| 2002/0136435 | A1 | 9/2002 | Prokoski |
| 2003/0088333 | A1 | 5/2003 | Liff et al. |
| 2003/0150907 | A1 | 8/2003 | Metcalf et al. |
| 2003/0174868 | A1 | 9/2003 | Adachi et al. |
| 2004/0061796 | A1 | 4/2004 | Honda et al. |
| 2004/0069590 | A1 | 4/2004 | Corrick et al. |
| 2004/0170318 | A1 | 9/2004 | Crandall et al. |
| 2005/0004897 | A1 | 1/2005 | Lipson et al. |
| 2005/0018894 | A1 | 1/2005 | Couwenhoven et al. |
| 2006/0067573 | A1 | 3/2006 | Parr et al. |
| 2006/0157152 | A1 | 7/2006 | Wolski et al. |
| 2006/0204107 | A1 | 9/2006 | Dugan et al. |
| 2006/0274921 | A1 | 12/2006 | Rowe |
| 2007/0098303 | A1 | 5/2007 | Gallagher et al. |
| 2007/0127787 | A1 | 6/2007 | Castleman et al. |
| 2007/0239565 | A1 | 10/2007 | Pentel |
| 2008/0025576 | A1 | 1/2008 | Li et al. |
| 2008/0170129 | A1 | 7/2008 | Yi et al. |
| 2008/0212899 | A1 | 9/2008 | Gokturk et al. |
| 2008/0269947 | A1 | 10/2008 | Beane et al. |
| 2009/0060288 | A1 | 3/2009 | Myers et al. |
| 2009/0080715 | A1 | 3/2009 | van Beek et al. |
| 2009/0135188 | A1 | 5/2009 | Ding et al. |
| 2009/0136100 | A1 | 5/2009 | Shinohara |
| 2009/0210240 | A1 | 8/2009 | Benschop et al. |
| 2009/0219405 | A1 | 9/2009 | Kaneda et al. |
| 2009/0229699 | A1 | 9/2009 | Arcuri |
| 2010/0014720 | A1 | 1/2010 | Hoyos et al. |
| 2010/0078290 | A1 | 4/2010 | Chang |
| 2010/0138037 | A1 | 6/2010 | Adelberg et al. |
| 2010/0158319 | A1 | 6/2010 | Jung et al. |
| 2010/0249994 | A1 | 9/2010 | Sinclair |
| 2010/0253801 | A1 | 10/2010 | Konishi |
| 2010/0303290 | A1* | 12/2010 | Mathe .................... G06V 40/23 382/103 |
| 2011/0074971 | A1 | 3/2011 | Kwon |
| 2011/0188712 | A1 | 8/2011 | Yoo et al. |
| 2011/0267259 | A1 | 11/2011 | Tidemand et al. |
| 2011/0298583 | A1 | 12/2011 | Libby et al. |
| 2011/0320037 | A1 | 12/2011 | Frugone |
| 2012/0002880 | A1 | 1/2012 | Lipson et al. |
| 2012/0075452 | A1 | 3/2012 | Ferren |
| 2012/0121193 | A1 | 5/2012 | Lipson et al. |
| 2012/0200689 | A1 | 8/2012 | Friedman et al. |
| 2012/0200729 | A1 | 8/2012 | Hoda et al. |
| 2013/0016882 | A1 | 1/2013 | Cavallini |
| 2013/0113941 | A1 | 5/2013 | Yoneyama |
| 2013/0215319 | A1 | 8/2013 | Tomita et al. |
| 2013/0242140 | A1 | 9/2013 | Uemura et al. |
| 2014/0037156 | A1 | 2/2014 | Cavallini |
| 2014/0063018 | A1* | 3/2014 | Takeshita ............. H04N 13/261 345/427 |
| 2014/0093140 | A1 | 4/2014 | Juveneton et al. |
| 2014/0109023 | A1 | 4/2014 | Murillo et al. |
| 2014/0369611 | A1 | 12/2014 | Takeuchi |
| 2014/0376813 | A1 | 12/2014 | Hongu et al. |
| 2015/0003692 | A1 | 1/2015 | Cavallini |
| 2015/0139497 | A1 | 5/2015 | Juveneton et al. |
| 2015/0248764 | A1 | 9/2015 | Keskin et al. |
| 2015/0253845 | A1 | 9/2015 | Kempinski et al. |
| 2015/0310289 | A1 | 10/2015 | Cavallini |
| 2016/0098882 | A1 | 4/2016 | Holdych et al. |
| 2016/0140390 | A1* | 5/2016 | Ghosh ...................... H04N 5/33 348/78 |
| 2016/0155127 | A1 | 6/2016 | Hartman |
| 2016/0335515 | A1 | 11/2016 | Juveneton et al. |
| 2016/0379287 | A1 | 12/2016 | Dabiri |
| 2017/0092150 | A1 | 3/2017 | Aljahdali et al. |
| 2017/0277945 | A1 | 9/2017 | Budihal et al. |
| 2018/0029859 | A1 | 2/2018 | Hevia et al. |
| 2019/0050921 | A1* | 2/2019 | Ryner .................. G06Q 20/204 |
| 2019/0206174 | A1 | 7/2019 | Miu et al. |
| 2019/0251562 | A1 | 8/2019 | Dabiri |
| 2019/0340418 | A1 | 11/2019 | Zecchini et al. |
| 2019/0377963 | A1 | 12/2019 | Hamid et al. |
| 2020/0327759 | A1 | 10/2020 | Neiman et al. |
| 2020/0399111 | A1 | 12/2020 | Gant et al. |
| 2020/0401792 | A1 | 12/2020 | McClellan et al. |
| 2021/0002120 | A1 | 1/2021 | Gant et al. |
| 2021/0188613 | A1 | 6/2021 | Gant et al. |
| 2021/0264583 | A1 | 8/2021 | Wolf et al. |

FOREIGN PATENT DOCUMENTS

| | | | |
|---|---|---|---|
| CN | 110472582 A | * | 11/2019 |
| DE | 102014106249 | | 11/2015 |
| EP | 1835440 | | 9/2007 |
| EP | 1990770 | | 11/2008 |
| EP | 2546782 | | 6/2014 |
| EP | 2713307 | | 5/2018 |
| EP | 3417429 | | 12/2018 |
| EP | 3525134 | | 8/2019 |
| GB | 2355054 | | 4/2001 |
| JP | 2003221098 | | 8/2003 |
| WO | WO 20030.33397 | | 4/2003 |
| WO | WO 2006023046 | | 3/2006 |
| WO | WO 2007076584 | | 7/2007 |
| WO | WO 2017098289 | | 6/2017 |
| WO | WO 2018236758 | | 12/2018 |
| WO | WO 2019056579 | | 3/2019 |

OTHER PUBLICATIONS

EP Search Report in European Appln. No. 21157939.6, dated Jul. 13, 2021, 12 pages.

Mantecon et al., "Depth-based face recognition using local quantized patterns adapted for range data," 2014 IEEE International Conference on Image Processing, Paris, France, Oct. 27-30, 2014, 293-297.

AU Office Action in Australian Appln. No. 2020204204, dated Aug. 4, 2021, 4 pages.

AU Office Action in Australian Appln. No. 2020204186, dated Jun. 7, 2021, 3 pages.

(56) References Cited

OTHER PUBLICATIONS

EP Search Report in European Appln. No. 20175201.1, dated Oct. 26, 2020, 8 pages.

Ani et al., "Comparative Study on Blink Detection and Gaze Estimation Methods for HCI, in Particular, Gabor Filter Utilized Blink Detection Method," 2011 Eighth International Conference on Information Technology: New Generations, Las Vegas, NV, Apr. 11-13, 2011, 441-446.

AU Office Action in Australian Appln. No. 2020204186, dated Jul. 28, 2020, 11 pages.

AU Office Action in Australian Appln. No. 2020204204, dated Aug. 24, 2020, 9 pages.

Bai et al., "Is Physics-based Liveness Detection Truly Possible with a Single Image?" IEEE International Symposium on Circuits and Systems, Paris, France, May 30-Jun. 2, 2010, 3425-3428.

Kollreider et al., "Verifying Liveness by Multiple Experts in Face Biometrics," IEEE Computer Society Conference on Computer Vision and Pattern Recognition Workshops, Anchorage, AK, Jun. 23-28, 2008, 6 pages.

Li et al., "Live Face Detection Based on the Analysis of Fourier Spectra," Proceedings of SPIE 5404: Biometric Technology for Human Identification, Orlando, FL, Apr. 12-16, 2004, 296-303.

Martin, "La fusion d'informations," Polycopie de cours ENSIETA—Ref.: 1484, Janvier 2005, 120 pages (with verified partial English translation).

Schwartz et al., "Face Spoofing Detection through Partial Least Squares and Low-Level Descriptors," IEEE International Joint Conference on Biometrics, Washington, DC, Oct. 11-13, 2011, 8 pages.

Scott [online], "Buying Draft Beer from a Vending Machine in Japan", Youtube, May 17, 2013, retrieved on Jan. 27, 2020, <https://www.youtube.com/watch?v=JNLW5vgKNw8>, 1 page [Video Submission].

Shafait et al., "Real Time Lip Motion Analysis for a Person Authentication System Using Near Infrared Illumination," IEEE International Conference on Image Processing, Atlanta, GA, Oct. 8-11, 2006, 1957-1960.

Tan et al., "Face Liveness Detection from a Single Image with Sparse Low Rank Bilinear Discriminative Model," 11th European Conference on Computer Vision, Heraklion, Crete, Greece, Sep. 5-11, 2010, 6:504-517.

Zhang et al., "Face Liveness Detection by Learning Multispectral Reflectance Distributions," IEEE International Conference on Automatic Face & Gesture Recognition, Santa Barbara, CA, Mar. 21-25, 2011, 436-441.

\* cited by examiner

IDENTITY AND LIVENESS VERIFICATION

CROSS-REFERENCE TO RELATED APPLICATIONS

This application claims priority to U.S. 62/979,641, filed on Feb. 21, 2020, the disclosure of which is expressly incorporated herein by reference in the entirety.

BACKGROUND

Automated systems have been developed that enable provisioning of goods and/or services to individuals based on authentication of identity. For example, automated systems can image an identification (e.g., driver's license, passport, corporate ID, university ID, etc.) to determine whether the person submitting the identification is the same person represented in the identification.

By way of non-limiting example, vending machines enable provisioning of goods and/or services to customers. In some instances, goods and/or services requested by customers can be restricted. For example, a customer may be required to be of a minimum age and/or have appropriate licensing, credentials, or other approval (e.g., prescription) to obtain particular goods and/or services. Using alcohol as a non-limiting example, a customer may be required to be at least 21 years of age to purchase and consume alcoholic beverages. Using tobacco as another non-limiting example, a customer may be required to be at least 18 years of age to purchase tobacco products. Using rental vehicles as still another non-limiting example, access to a rental vehicle can be limited to customers having a valid driver license and being of at least a certain age (e.g., 18 years old, 24 years old).

While automated systems, such as vending machines, provide numerous advantages, provisioning of identity-restricted goods and/or services requires particular functionality in order to be fully automated. For example, the automated system itself is required to authenticate documentation provided by the customer (e.g., license, passport, identification, prescription) as well as the customer (e.g., verify that the customer requesting the goods/services matches the person associated with the documentation). Although systems have been developed to perform such functionality, traditional systems can suffer from disadvantages. For example, a customer can spoof an authentication system by displaying an image of another person to a camera that generates images of persons presenting ID to confirm that they are the same person depicted in the so-presented ID. In some instances, automated systems for verifying that the owner of the identification is the same person submitting the identification for verification cannot determine that the image of the person presenting the ID actually depicts an image of another person.

SUMMARY

Implementations of the present disclosure are generally directed to liveness detection in authenticating individuals based on identifications. More particularly, implementations of the present disclosure are directed to using infra-red (IR) imaging to detect liveness of an individual that is presenting identification for authentication. As described in further detail herein, liveness detection of the present disclosure enables detection of instances of spoofing, in which an individual presenting identification is pretending to be another individual, who is represented in the identification. Implementations of the present disclosure further provide for age verification to verify an age of the individual presenting identification for age-restricted goods and/or services.

In some implementations, actions include receiving a color image and an IR image, the IR image taken contemporaneously with the color image, providing a set of facial landmarks depicted in the color image, determining a depth value for each facial landmark in the set of color landmarks, depth values being provided from the IR image, determining an average depth difference based on at least a sub-set of facial landmarks in the set of facial landmarks, comparing the average depth difference to a difference threshold to provide a comparison, and selectively authenticating the person based on the comparison. Other implementations of this aspect include corresponding systems, apparatus, and computer programs, configured to perform the actions of the methods, encoded on computer storage devices.

These and other implementations can each optionally include one or more of the following features: providing a set of facial landmarks is executed in response to determining that a face is depicted in the color image; determining a depth value for each facial landmark in the set of color landmarks includes, for each facial landmark: determining coordinates of the facial landmark in the color image, transposing the coordinates to the IR image to provide transposed coordinates, and assigning a depth value of the IR image at the transposed coordinates to the facial landmark; transposing the coordinates includes adding at least one offset value to the coordinates; selectively authenticating the person based on the comparison includes at least partially authenticating the person in response to the comparison including the average depth difference exceeding the difference threshold; determining an average depth difference includes determining a depth difference between at least one facial landmark and an anchor facial landmark and calculating the average depth difference based on the depth difference; the anchor facial landmark includes a nose tip; actions further include providing the sub-set of facial landmarks by filtering at least one facial landmark having a depth value of zero from the set of facial landmarks; determining an average depth difference is performed in response to determining that an anchor landmark in the sub-set of facial landmarks has a non-zero depth value assigned thereto; actions further include at least partially authenticating the person in response to determining that an estimated age exceeds an age verification skip threshold age; actions further include at least partially authenticating the person in response to determining that an age difference exceeds a years threshold; the age difference includes a difference between an actual age determined based on a birth date indicated in the identification and an estimated age determined from the color image; and the age difference includes a difference between an age sum and an estimated age determined from the color image, the age sum including a sum of an age of the identification and an estimated age determined from an image of the identification.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Implementations of the present disclosure are generally directed to liveness detection in authenticating individuals based on identifications. More particularly, implementations of the present disclosure are directed to using infra-red (IR) imaging to detect liveness of an individual that is presenting identification for authentication. As described in further detail herein, liveness detection of the present disclosure enables detection of instances of spoofing, in which an individual presenting identification is pretending to be another individual, who is represented in the identification. Implementations of the present disclosure further provide for age verification to verify an age of the individual presenting identification for age-restricted goods and/or services.

Implementations of the present disclosure are described in further detail herein in an example context with reference to an example automated system. The example automated system includes a vending machine, and more particularly, a vending machine that dispenses restricted products (e.g., age restricted). In the example described herein, the vending machine is a beverage vending machine that dispenses alcoholic beverages (e.g., beverages restricted to persons aged 21 and above). It is contemplated, however, that implementations of the present disclosure can be realized with any appropriate automated system. An example of such an automated system is described in commonly assigned U.S. Pat. No. 10,726,246, which is expressly incorporated herein by reference in the entirety for all purposes. Accordingly, the example context discussed herein includes liveness detection and age verification in attempted access to age-restricted products and/or services.

Figure 1A:
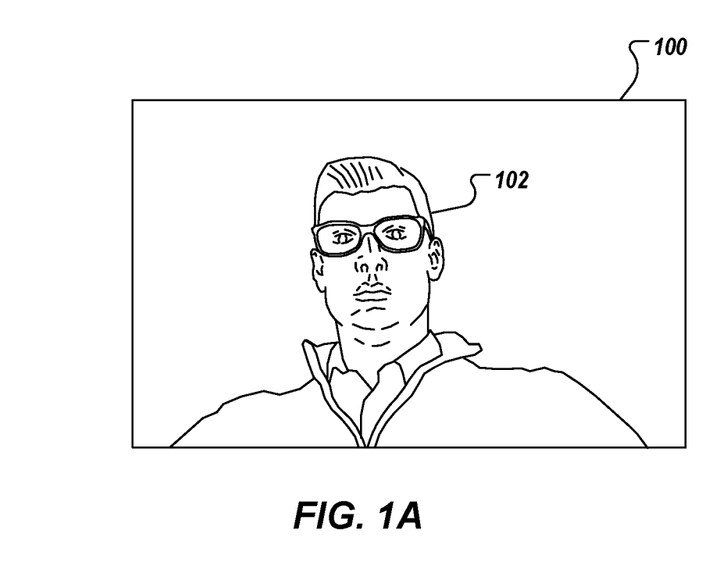
FIG. 1A depicts a representation of an image of a person presenting identification.

FIG. 1A depicts a representation of an image 100 of a person presenting identification. For example, the image 100 can be generated by a camera in response to the person presenting identification. The image 100 depicts a portion of a user (person) including a face 102 of the user. Although depicted as a line drawing, the image 100 of FIG. 1A can be provided as a color image. In some examples, the image 100 is provided as a digital image represented as data, the data providing values for each of a plurality of pixels that the color image is composed of In some examples, each pixel includes respective values for a blue channel, a green channel, a red channel, and an alpha channel, where alpha represents the opaqueness of the respective pixel (e.g., BGRa format).

Figure 1B:
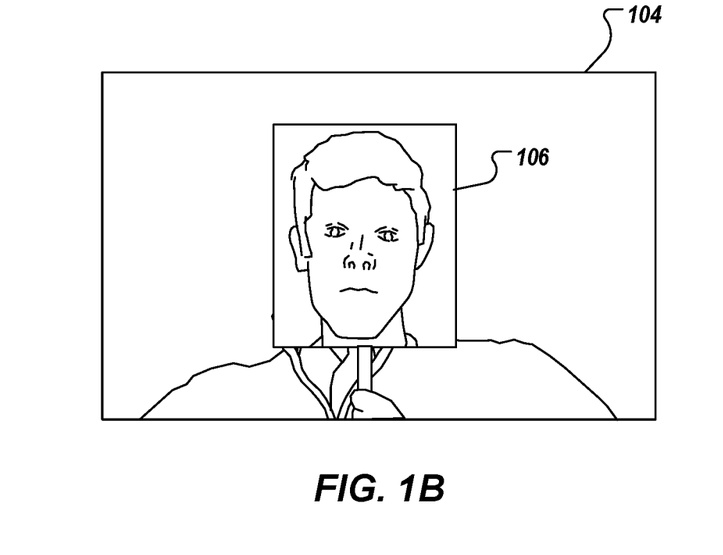
FIG. 1B depicts a representation of an image of a person attempting spoofing while presenting identification.

FIG. 1B depicts a representation of an image 104 of a person attempting spoofing while presenting identification. In this example, the person is holding up an image 106 depicting the face of another person (e.g., in an attempt to represent the other person as presenting identification). Although depicted as a line drawing, the image 100 of FIG. 1A can be provided as a color image. In some examples, the image 100 is provided as a digital image represented as data, the data providing values for each of a plurality of pixels that the color image is composed of In some examples, each pixel includes respective values for a blue channel, a green channel, a red channel, and an alpha channel, where alpha represents the opaqueness of the respective pixel (e.g., BGRa format).

In some examples, and as discussed in further detail herein, each of the images 100, 104 can be processed to determine whether a face is depicted in the image 100, 104, and, if a face is depicted, a location of one or more facial landmarks within the image 100, 104. Example facial landmarks can include, without limitation, nose tip, left pupil, right pupil, left outer pupil, and right outer pupil. In some examples, each facial landmark can be associated with location data representing a location of the facial landmark within the image 100, 104. Example location data can include, without limitation, coordinates (e.g., x, y coordinates within the image 100, 104). Implementations of the present disclosure are illustrated in further detail herein with non-limiting reference to coordinates.

Figure 2A:
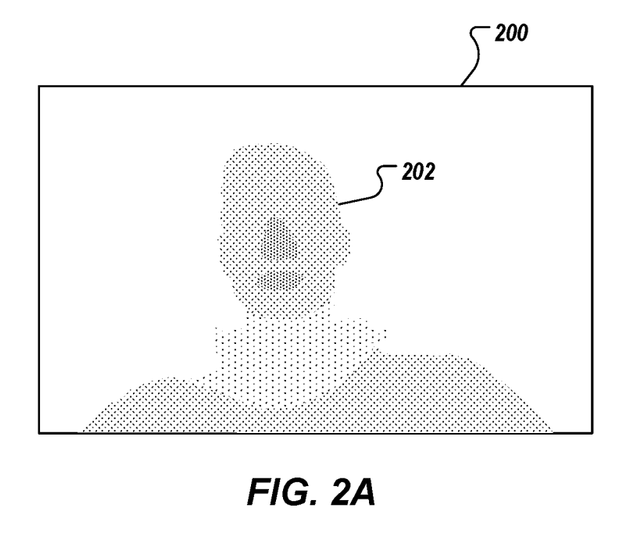
FIG. 2A depicts a representation of an infrared (IR) image of the person of FIG. 1A presenting identification.

FIG. 2A depicts a representation of an IR image 200 of the person of FIG. 1A presenting identification. For example, the IR image 200 can be generated by a camera in response to the person presenting identification. In some examples, the IR image 200 is generated contemporaneously with (e.g., at the same time as, or within a threshold time of generation of the image 100 of FIG. 1A). The image 200 depicts an IR representation of a portion of the user including a face 202 of the user. Although depicted as a line drawing, the image 200 of FIG. 2A can be provided as an IR image depicting colors within an IR spectrum. In some examples, the image 100 is provided as a digital image represented as data, the data providing values for each of a plurality of pixels that the IR image is composed of In some examples, each pixel includes respective values for a blue channel, a green channel, a red channel, and an alpha channel, where alpha represents the opaqueness of the respective pixel (e.g., BGRa format).

Figure 2B:
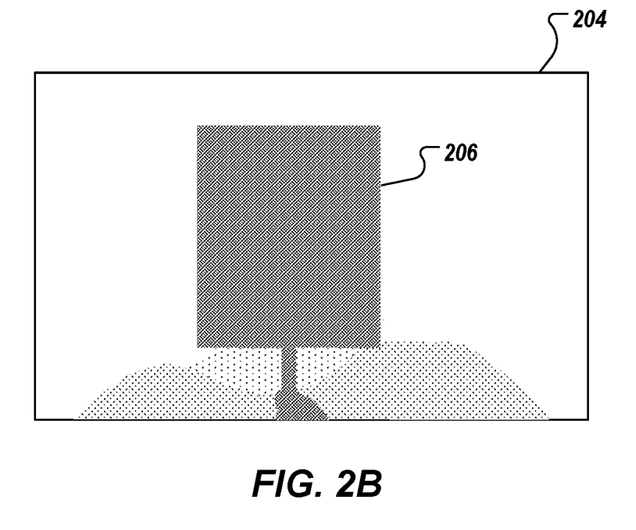
FIG. 2B depicts a representation of an IR image of the person of FIG. 1B attempting spoofing while presenting identification.

FIG. 2B depicts a representation of an IR image 204 of the person of FIG. 1B attempting spoofing while presenting identification. For example, the IR image 204 can be generated by a camera in response to the person presenting identification. In some examples, the IR image 204 is generated contemporaneously with (e.g., at the same time as, or within a threshold time of generation of the image 104 of FIG. 1B). The image 204 depicts an IR representation of a portion of the user including an IR representation 206 of the image 106 of FIG. 1B depicting the face of another person.

As introduced above, implementations of the present disclosure are directed to using IR imaging to detect instances of spoofing in authentication processes. More particularly, and as described in further detail herein, implementations of the present disclosure can include authentication (also referred to as verification) of a customer using a multi-step process, in which a user (customer) first inserts an identification (ID) (e.g., a government issued ID) into a scanner, and images of the user are taken, both a color (RGB) image of the user and an IR image of the user. In some implementations, it is determined whether the ID is valid and untampered, as well as that the user is present (also referred to as lively or liveness) at the camera and is the person on the ID. In some examples, the process can generally include: determining a government issued ID is valid, validating user liveliness using depth readings from IR sensor and camera photo, performing age estimation on the ID photo and camera photo to validate user is within a specified age range, and performing facial matching between camera photo and ID photo.

In further detail, the ID is scanned (e.g., one or more images of the ID taken), and it can be determined whether the ID is valid and unexpired. Whether the ID is valid and unexpired can be determined as described in commonly assigned U.S. Pat. No. 10,726,246. In some examples, it is determined whether the ID has been tampered with. For example, whether an ID has been tampered with can be determined based on an ultra-violet (UV) signature of the ID, as described in further detail in commonly assigned U.S. Prov. App. No. 62/979,605, entitled DETECTING IDENTIFICATION TAMPERING USING ULTRA-VIOLET IMAGING, and filed on Feb. 21, 2020, the disclosure of which is expressly incorporated herein by reference in the entirety for all purposes. In some examples, if it is determined that the ID is invalid, expired, or tampered with, authentication of the user is denied. In some examples, if it is determined that the ID is valid, unexpired, and has not been tampered with, authentication of the user continues.

In accordance with implementations of the present disclosure, liveness of a user presenting the ID is determined based on IR imaging, as described in further detail herein. In a general sense, liveness can refer to determining whether a person is actually present at the time an ID is being presented. In some examples, liveness can be used to detect instances of a user attempting to spoof. Spoofing can be described as the user presenting the ID not being, but pretending to be the person represented in the ID. An example of spoofing is depicted above with reference to FIGS. 1B and 2B.

In accordance with implementations of the present disclosure, liveness can be determined based on a color image and an IR image of a user presenting the ID. To this end, when the user is presenting the ID, both a color image and an IR image are captured. For example, respective cameras can capture the color image and the IR image. In some examples, the color image and the IR image are generated contemporaneously with one another (e.g., at the same time, or within a threshold time of each other).

In some implementations, at least the color image is processed to determine whether a face is depicted in the color image. For example, the color image can be provided as input to a facial detection system, which can provide output indicating whether a face is depicted in the color image. In some examples, if no face is detected, the process ends and/or another set of images (color image, IR image) are captured. In some examples, if a face is detected, the output also includes an indication of a location of the face within the color image (e.g., a bound around the face (coordinates of a bound)).

In some implementations, and if a face is detected, at least a portion of the color image is processed to determine facial landmarks. For example, the output of the facial detection system can include a set of facial landmarks, and, for each facial landmark, location data (e.g., coordinates). In some examples, the set of facial landmarks include nose tip, left pupil, right pupil, left outer pupil, and right outer pupil.

In some implementations, for each facial landmark, a depth is determined from the IR image. In some implementations, a location of each facial landmark is determined within the IR image by transposing the coordinates of the facial landmark from the color image to the IR image. In some examples, transposing coordinates can include directly using the coordinates from the color image as the coordinates in the IR image (i.e., the coordinate location of the facial landmark in the color image is used as the same coordinate location of the facial landmark in the IR image). In some examples, transposing coordinates can include using the coordinates from the color image and adding an offset to provide the coordinates in the IR image (i.e., the coordinate location of the facial landmark in the color image is offset to provide the coordinate location of the facial landmark in the IR image). In some examples, the offset (e.g., one or more ±values) accounts for a difference of locations of cameras generating the respective images and, hence, a difference of facial landmark locations in the respective images.

In some implementations, a depth value is determined for each facial landmark based on the location of the facial landmark determined in the IR image. In some examples, each pixel of the IR image has a depth value associated therewith.

Accordingly, a set of facial landmarks is provided, each facial landmark having a depth value assigned thereto. In some examples, the set of facial landmarks is processed to filter out any facial landmarks that have a depth value of 0. After filtering, the set of facial landmarks includes n facial landmarks, where n≥2. The set of facial landmarks is processed to determine whether an anchor landmark is included in the set of facial landmarks. An example anchor landmark includes, without limitation, a nose tip. In some examples, if the anchor landmark has been filtered from the set of facial landmarks (i.e., the anchor landmark has a depth value of 0), liveness cannot be detected based on the set of images. In such a case, another set of images (color image, IR image) can be taken and processed.

If the anchor landmark has not been filtered, the depth value of the anchor landmark is compared to the depth values of each of the other facial landmarks to determine respective differences (e.g., deltas (Δ's)). The following example relationship is provided:

$$\Delta_i = depth_{anchor} - depth_{landmark,i}$$

In the example case of the anchor landmark, the following example relationship is provided:

$$\Delta_i = depth_{noesetip} - depth_{landmark,i}$$

In some examples, an average difference ($\overline{\Delta}$) is determined. The following example relationship is provided:

$$\overline{\Delta} = \frac{\sum_{i=1}^{n-1} \Delta_i}{n-1}$$

In some examples, if the average difference exceeds an average depth threshold (e.g., 1 cm), it is determined that the face depicted in the color image has depth and liveness is detected. In some examples, if the average difference does not exceed the average depth threshold, it is determined that the face depicted in the color image is absent depth and liveness is not detected.

In some implementations, an age of the person presenting the ID can be verified. In some examples, a set of age verification data is determined. Example age verification data includes an actual age ($A_{ACT}$), an estimated ID photo age ($A_{ESTID}$), an estimated live photo age ($A_{EST}$, also referred to as selfie age), and an ID age. In some examples, the actual age is determined based on a birth date indicated on the ID (e.g., as a difference between a current date and the birth date). In some examples, the estimated ID photo age is determined by processing the ID photo (the photo depicted on the ID) through an age estimation service, which estimates an age of the person depicted on the ID photo. In some examples, the estimated live photo age is determined by processing the color image (e.g., the image used for liveness detection) through the age estimation service, which estimates an age of the person depicted on the color image. In some examples, the ID age is provided as a number of years passed since the ID was issued and is determined as a difference between a current date and the issue date of the ID (e.g., read from the ID).

In some implementations, if the selfie age exceeds an age skip threshold (e.g., 25 years), age verification is skipped. If the selfie age does not exceed the age skip threshold, it is determined whether the actual age is within a threshold range (years threshold ($THR_{YRS}$)) (e.g., 4 years) of the selfie age. The following example relationship is provided:

|Actual Age−Selfie Age|≤Years Threshold

If the actual age is within the threshold range, age verification is passed. If the actual age is not within the threshold range, it is determined whether a sum of the estimated ID photo age and the ID age is within a threshold range (years threshold) (e.g., 4 years) of the selfie age. The following example relationship is provided:

|(Estimated ID Photo Age+ID Age)−Selfie Age−|≤Years Threshold

If within the threshold range, age verification is passed. If not within the threshold range, age verification fails.

Figure 3:
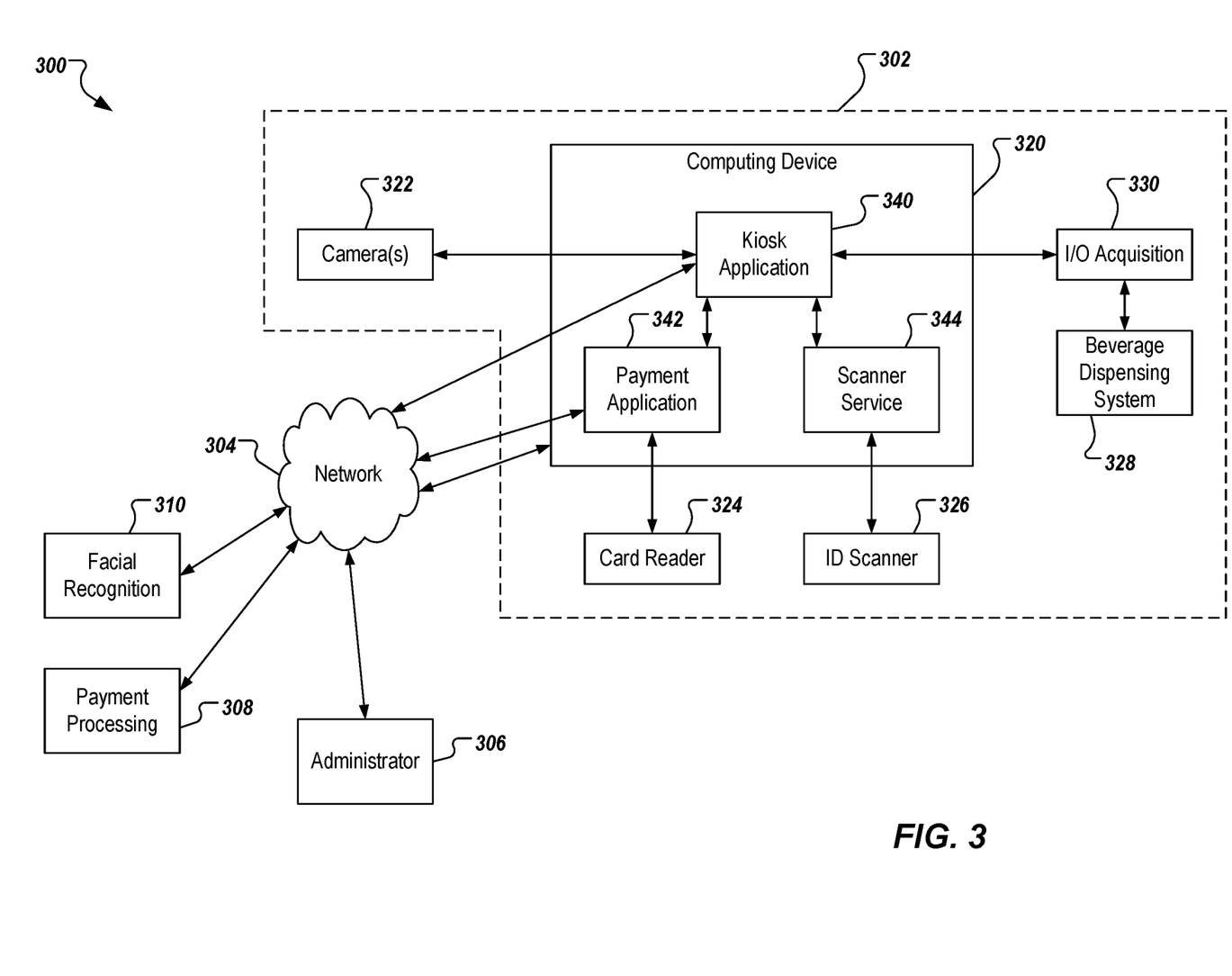
FIG. 3 depicts an example architecture in accordance with implementations of the present disclosure.

FIG. 3 depicts an example architecture 300 in accordance with implementations of the present disclosure. The example architecture of FIG. 3 is described in detail in commonly assigned U.S. Pat. No. 10,726,246. The example architecture 300 includes a vending machine 302, a network 304, an administrator system 306, a payment processing system 308, and a facial recognition system 310. In some examples, the network 304 is provided as a large computer network, such as a local area network (LAN), a wide area network (WAN), the Internet, a cellular network, a telephone network (e.g., PSTN) or an appropriate combination thereof connecting any number of vending machines 302, communication devices, mobile computing devices, fixed computing devices and server systems.

In some examples, each of the administrator system 306, the payment processing system 308, and the facial recognition system 310 is hosted on one or more servers and are accessible by the vending machine 302 over the network 304. In some examples, the administrator system 306 is operated by or on behalf of the enterprise that operates the vending machine 302. For example, the enterprise can remotely interact with the vending machine 302 through the administrator system 306 to perform one or more functionalities of a plurality of functionalities (e.g., update software, set configuration parameters, perform diagnostics, receive sales data, receive consumption data), as described in further detail herein. In some examples, the payment processing system 308 is operated by a third-party payment processing service, as described in further detail herein. In some examples, the facial recognition system 310 is operated by a third-party facial recognition service, as described in further detail herein.

In the example of FIG. 3, the vending machine 302 includes a computing device 320, one or more cameras 322, a card reader 324, an ID scanner 326, a beverage dispensing system 328, and in input/output (I/O) acquisition system 330 (e.g., LabJack T7).

In some examples, the computing device 320 includes any appropriate type of computing device such as, and without limitation, a desktop computer, a laptop computer, a hand-held computer, and a tablet computer. For example, the computing device 320 can be provided as an industrial personal computer (PC) that executes an operating system (e.g., Windows 10 provided by Microsoft Corp.). The computing device 320 executes a kiosk application 340, a payment application 342, and a scanner service 344. In some examples, each of the kiosk application 340, the payment application 342, and the scanner service 344 is provided as one or more computer-executable programs executed by the computing device 320. In some examples, the computing device 320 is in communication (e.g., wired, wireless) with the one or more cameras 322 to receive image data and/or audio data (e.g., the kiosk application 340 ingests at least a portion of image data and/or audio data provided from the one or more cameras).

In some examples, the computing device 320 is in communication (e.g., wired, wireless) with the beverage dispensing system 328. In the depicted example, the computing device 320 is in communication with the beverage dispensing system 328 through the I/O acquisition system 330. In some examples, the kiosk application 340 issues commands to and/or receives data from the beverage dispensing system 328. For example, the kiosk application 340 can issue commands to the beverage dispensing system 328 to dispense a particular beverage selected by a consumer. As another example, the kiosk application 340 can receive data from the beverage dispensing system 328, the data indicating a status of the beverage dispensing system 328 and/or one or more beverages within the vending machine 302. Example data can include, without limitation, beverage quantity, beverage temperature, hardware faults, software faults.

In some examples, the computing device 320 is in communication (e.g., wired, wireless) with each of the card reader 324 and the ID scanner. In some examples, the card reader 324 reads payment information (e.g., from a credit/debit/gift card) and provides the payment information to the payment application. In some examples, the payment application 342 provides at least a portion of the payment information to the payment processing system 308, which processes the at least a portion of the payment information to provide a payment approval or payment denial decision (e.g., the payment submitted by the consumer has been approved/denied). In some examples, the payment application 342 receives the payment decision from the payment processing system 308 and provides the payment decision to the kiosk application 340, which determines whether to serve a beverage to the consumer at least partially based on the payment decision (e.g., if the payment is approved and the consumer is authenticated and is of the required age, serve the beverage; if the payment is approved, but the consumer is either not authenticated or is not of the required age, do not serve the beverage; if the payment is not approved, do not serve the beverage).

In some examples, the ID scanner 326 scans an identification presented by a consumer to determine at least a portion of the consumer-specific information. For example, the ID scanner 326 can record an image of the identification and can process the image (e.g., using optical character recognition, and/or image recognition) to determine one or more of the identification image(s), the name, the address, the DOB, the age, the address, the unique identifier, and the gender recorded on the identification. As another example, the ID scanner 326 can read a memory of the identification to retrieve one or more of the identification image(s), the name, the address, the DOB, the age, the address, the unique identifier, and the gender recorded on the identification.

In some implementations, the ID scanner 326 reads a barcode (and/or QR code), magnetic strip, and takes full front and back images of the identification for OCR. In some examples, the scanner service 344 validates the identification by cross-referencing the data and checking for security. In some implementations, the kiosk application 340 reads only the information necessary to check the results of the ID validation, validate the consumer's DOB, and first name for a personalized experience (e.g., display the user's name in the UI). In some examples, no personally identifiable information (PII) is stored in the vending machine 302. In some examples, the only personal consumer information that is transmitted from the vending machine 302 is the image from the identification and the image, video, and/or audio that is captured by the vending machine 302 (e.g., sent to the facial recognition service 310). However, this data is not persisted at either the vending machine 302 or by the facial recognition service 310.

In some implementations, and as described in further detail herein, the kiosk application 340 receives data representative of a consumer requesting beverage service and determines whether to serve the consumer at least partially based on the data. In some implementations, the kiosk application 340 receives at least a portion of the consumer-specific data provided from the identification, as described herein. Example consumer-specific information can include, without limitation, image data (e.g., picture provide with the identification), gender, height, age, name, and address. In some examples, the kiosk application 304 receives at least a portion of ID-specific data provided for the identification. Example ID-specific data can include, without limitation, one or more patterns, an expiration date, and one or more watermarks (e.g., visible, invisible, ultra-violet (UV)). In some examples, the kiosk application 340 receives current consumer data representative of the consumer, who is present at the vending machine 302 and is requesting service. Example current consumer data can include, without limitation, image data, video data, and audio data (e.g., provided from the one or more cameras 322).

In accordance with implementations of the present disclosure, the kiosk application 340 determines whether the identification is expired. In some examples, determining whether the identification is expired can be executed by processing at least a portion of the ID-specific data. For example, the kiosk application 340 can compare an expiration date of the identification to a current date to determine whether the identification has expired. If the identification is expired, no further processing is required, as it can be determined that the consumer cannot be served without an unexpired identification. If the identification is not expired, further processing can be performed to determine whether the consumer can be served.

In some implementations, the kiosk application 340 determines whether the age indicated on the identification is of a legal age for consumption of the beverage. For example, the kiosk application 340 can compare the age indicated on the identification (e.g., by comparing a current date to the DOB provided on the identification) to a legal age (e.g., a statutorily-defined legal age for the particular location). If the age is not of the legal age, no further processing is required, as it can be determined that the consumer cannot be served. If the age is of the legal age, further processing can be performed to determine whether the consumer can be served.

In some implementations, the kiosk application 340 determines whether the presented identification is authentic. That is, the kiosk application 340 determines whether the identification is real, a forgery, or damaged such that authenticity cannot be determined. If it is determined that the identification is not authentic, no further processing is required, as it can be determined that the consumer cannot be served without an authentic identification. If it is determined that the identification is authentic, further processing can be performed to determine whether the consumer can be served.

In some examples, the kiosk application 340 can process at least a portion of the ID-specific data to determine whether the identification is authentic. In some examples, features of the presented identification can be compared to known features of the particular type of identification. Example features can include, without limitation, one or more patterns, one or more watermarks, one or more images, and locations of each on the identification. Example features can also include, without limitation, locations and/or format of text depicted on the identification.

In some examples, features of the presented identification can be compared to known features based on a set of rules, each rule defining whether a feature conforms to a respective known feature. In some examples, multiple sets of rules can be provided, each rule corresponding to a respective type (e.g., residence card, driver's license, passport) and/or issuing authority (e.g., city, state, national government) of the identification. For example, it can be determined that the identification is a driver's license from the State of Texas (e.g., text on the license can be processed using optical character recognition (OCR) to determine a type of identification and the issuing authority; an image of the identification can be processed through a machine learning (ML) model that is trained to classify identifications into types and/or issuing authorities based on images of the identifications; that is, the ML model outputs a type and an authority). In response to determining that the identification is a driver's license from the State of Texas, a set of rules corresponding to Texas driver's licenses can be used.

In some examples, the image of the identification can be processed through a ML model that is trained to classify identifications as authentic or as inauthentic. For example, the ML model can be trained based on known, authentic identifications to be able to discern between inauthentic identifications and authentic identifications. In some examples, the ML model outputs one or more classifications, each classification having a confidence score. For example, the ML model can output a classification of authentic with a confidence score of 0.98. The confidence score represents a relative confidence in the accuracy of the classification. In some examples, the confidence score can be compared to a threshold confidence score. If the confidence score exceeds the threshold confidence score, the classification is determined to be correct. If the confidence score does not exceed the threshold confidence score, the classification is determined to be incorrect. If the classification is determined to be correct, the identification is, in the example above, determined to be authentic. If the classification is determined to be incorrect, the identification is, in the example above, determined to be inauthentic.

In some implementations, at least a portion of the current consumer data can be processed to determine whether the consumer, who presented the identification is authentic. That is, it is determined whether the consumer, who presented the identification is the person represented by the identification (e.g., to determine whether the consumer is using someone else's identification). For example, current consumer data can include image data and/or video data depicting the consumer that is present at the vending machine 302. In some examples, the image data and/or the video data can be processed to determine whether the consumer matches the image provided with the identification. For example, the image data and/or the video data, and the image from the identification can be provided to the facial recognition system 310, which can process the data to determine whether the consumer matches the image provided with the identification. If the consumer does not match the image provided from the identification, it can be determined that the consumer is not authentic and cannot be served. If the consumer does match the image provided from the identification, it can be determined that the consumer is authentic and can be served.

For example, the facial recognition system 310 can employ one or more facial recognition models (e.g., ML models) that can compare images to determine whether faces depicted in the images match. In some examples, the facial recognition system 310 receives the image from the identification and the image from the vending machine, each image depicting a face. The facial recognition system 310 processes the images to determine whether the faces are the same. For example, a ML model can process the images and outputs one or more classifications, each classification having a confidence score. For example, the ML model can output a classification of match with a confidence score of 0.98. The confidence score represents a relative confidence in the accuracy of the classification. In some examples, the confidence score can be compared to a threshold confidence score. If the confidence score exceeds the threshold confidence score, the classification is determined to be correct. If the confidence score does not exceed the threshold confidence score, the classification is determined to be incorrect. If the classification is determined to be correct, the faces depicted in the images, in the example above, are determined to match. If the classification is determined to be incorrect, the faces depicted in the images, in the example above, are determined to not match.

In some implementations, the image data and/or the video data can be processed to determine demographic features of the consumer. Example demographic features can include, without limitation, age, gender, and height. For example, the image data and/or the video data can be provided to a demographic feature system, which can process the data to determine demographic features of the consumer. In some examples, the demographic features can be compared to respective demographic features of the consumer-specific information provided from the identification. In some examples, if at least a portion of the demographic features of the consumer do not match the respective demographic features of the consumer-specific information provided from the identification, and/or the consumer does not match the image provided from the identification, it can be determined that the consumer is not authentic and cannot be served.

For example, the demographic feature system (e.g., which can be a system also provided with the facial recognition system 310) can employ one or more demographic feature recognition models (e.g., ML models) that can analyze images to determine demographic features of a person depicted therein. In some examples, the demographic feature system receives the image from the vending machine (an image generated by the vending machine) and processes the image to determine one or more demographic features. For example, a ML model can process the image and outputs one or more classifications, each classification having a confidence score. For example, the ML model can output a classification of an age with a confidence score of 0.98. The confidence score represents a relative confidence in the accuracy of the classification. In some examples, the confidence score can be compared to a threshold confidence score. If the confidence score exceeds the threshold confidence score, the classification is determined to be correct. If the confidence score does not exceed the threshold confidence score, the classification is determined to be incorrect. If the classification is determined to be correct, the demographic feature (e.g., age) determined from the image, in the example above, is determined to be correct. If the classification is determined to be incorrect, the demographic feature (e.g., age) determined from the image, in the example above, is determined to be incorrect.

Figure 4:
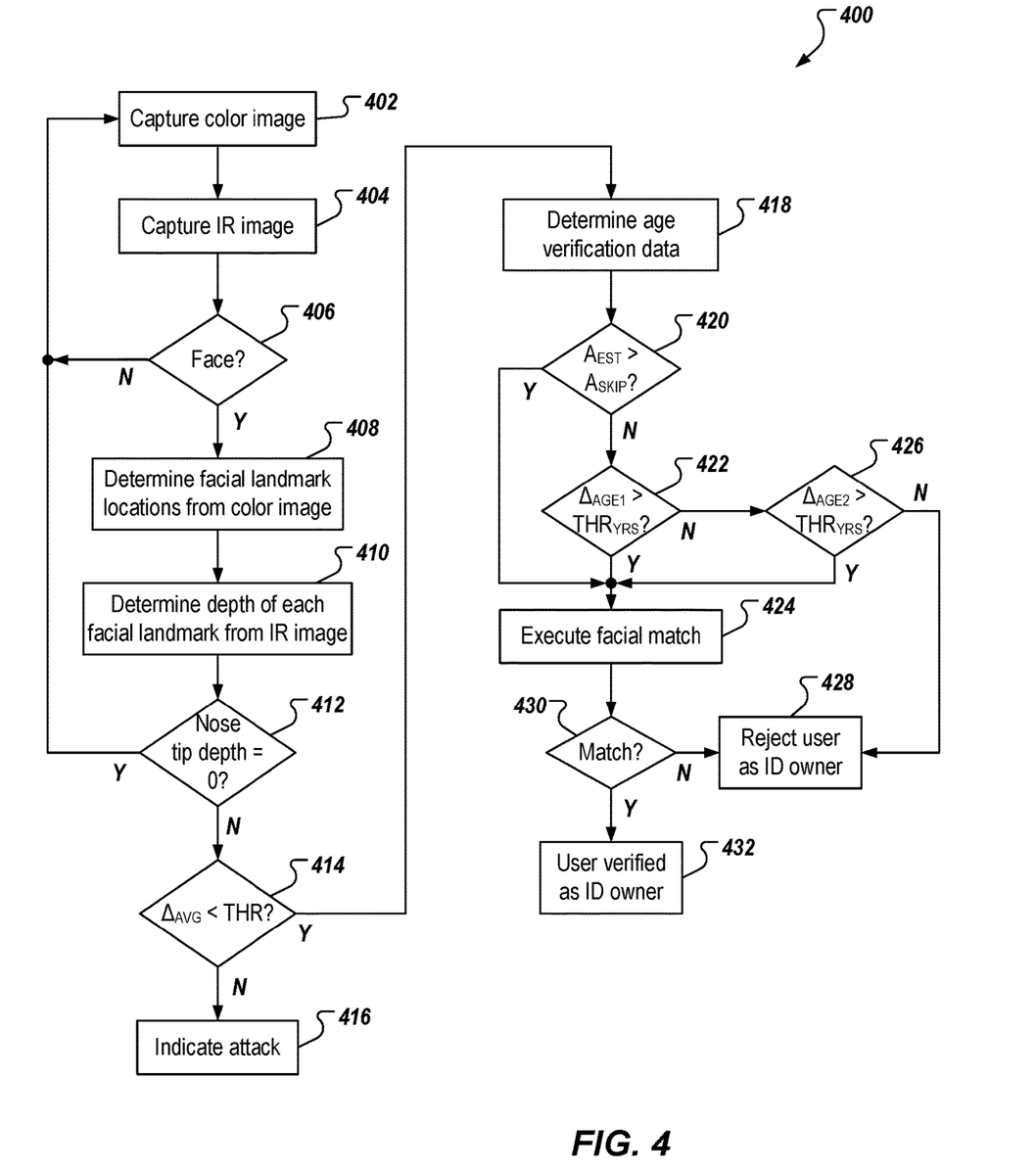
FIG. 4 depicts an example process in accordance with implementations of the present disclosure.

FIG. 4 depicts an example process 400 that can be executed in implementations of the present disclosure. In some examples, the example process 400 is provided using one or more computer-executable programs executed by one or more computing devices.

A color image is captured (402) and an IR image is captured (404). For example, one or more cameras capture the color image and the IR image. In some examples, the color image and the IR image are captured and depict a user presenting an ID (e.g., to an automated system). It is determined whether a face is depicted in the color image (406). For example, the color image can be provided as input to a facial detection system, which can provide output indicating whether a face is depicted in the color image. In some examples, if no face is detected, the process ends and/or another set of images (color image, IR image) are captured.

In some examples, if a face is detected, a set of facial landmarks and respective locations are determined (408). For example, at least a portion of the color image is processed to determine facial landmarks. For example, the output of the facial detection system can include a set of facial landmarks, and, for each facial landmark, location data (e.g., coordinates). In some examples, the set of facial landmarks include nose tip, left pupil, right pupil, left outer pupil, and right outer pupil. A depth value for each facial landmark in the set of facial landmarks is determined (410). For example, each pixel of the IR image has a depth value associated therewith. At least one pixel associated with each facial landmark is determined (e.g., based on coordinates of the facial landmark) and the depth value of the at least one pixel is associated with the facial landmark.

It is determined whether the depth value of an anchor landmark is zero (412). For example, a set of facial landmarks is provided, each facial landmark having a depth values assigned thereto. In some examples, the set of facial landmarks is processed to filter out any facial landmarks that have a depth value of 0. After filtering, the set of facial landmarks includes n facial landmarks, where n≥2. The set of facial landmarks is processed to determine whether an anchor landmark is included in the set of facial landmarks.

An example anchor landmark includes, without limitation, a nose tip. In some examples, if the anchor landmark has been filtered from the set of facial landmarks (i.e., the anchor landmark has a depth value of 0), liveness cannot be detected based on the set of images. In such a case, another set of images (color image, IR image) can be taken and processed.

If the anchor landmark has not been filtered, the depth value of the anchor landmark is compared to the depth values of each of the other facial landmarks to determine respective differences (e.g., deltas ($\Delta$'s)). It is determined whether an average depth difference ($\bar{\Delta}$ or $\Delta_{AVG}$) exceeds a threshold (414). If the average depth difference does not exceed the threshold, a spoofing attack is indicated (416). In some examples, the user presenting the ID is denied access to goods and/or services.

If the average depth difference does not exceed the threshold, age verification data is determined (418). For example, age verification data includes an actual age ($A_{ACT}$), an estimated ID photo age ($A_{ESTID}$), an estimated live photo age ($A_{EST}$, also referred to as selfie age), and an ID age. In some examples, the actual age is determined based on a birth date indicated on the ID (e.g., as a difference between a current date and the birth date). In some examples, the estimated ID photo age is determined by processing the ID photo (the photo depicted on the ID) through an age estimation service, which estimates an age of the person depicted on the ID photo. In some examples, the estimated live photo age is determined by processing the color image (e.g., the image used for liveness detection) through the age estimation service, which estimates an age of the person depicted on the color image. In some examples, the ID age is provided as a number of years passed since the ID was issued and is determined as a difference between a current date and the issue date of the ID (e.g., read from the ID).

It is determined whether an estimated live photo age ($A_{EST}$, selfie age) exceeds an age skip threshold ($A_{SKIP}$) (420). If the selfie age does not exceed the age skip threshold, it is determined whether the actual age is within a threshold range (years threshold (THR$_{YRS}$)) (e.g., 4 years) of the selfie age. More particularly, it is determined whether a first age difference ($\Delta_{AGE1}$) exceeds a years threshold (THR$_{YRS}$) (422). In some examples, $\Delta_{AGE1}$ is determined based on the following example relationship:

$$|\text{Actual Age} - \text{Selfie Age}| = \Delta_{AGE1}$$

If the actual age is within the threshold range, age verification is passed, and a facial match is executed (424). If the actual age is not within the threshold range, it is determined whether a sum of the estimated ID photo age and the ID age is within a threshold range (years threshold) (e.g., 4 years) of the selfie age. More particularly, it is determined whether a second age difference ($\Delta_{AGE2}$) exceeds a years threshold (THR$_{YRS}$) (426). In some examples, $\Delta_{AGE2}$ is determined based on the following example relationship:

$$|(\text{Estimated ID Photo Age} + \text{ID Age}) - \text{Selfie Age}| = \Delta_{AGE1}$$

If within the threshold range, age verification is passed, and a facial match is executed (424). If not within the threshold range, age verification fails, and the user (who presented the ID) is rejected as the owner of the ID (428).

It is determined whether a face depicted in the color image matches a face depicted in the ID photo (430). For example, each of the color image and the image provided in the ID photo can be provided as input to a matching service, which provides output indicating either a match or a non-match. If the face depicted in the color image does not match the face depicted in the ID photo, the user (who presented the ID) is rejected as the owner of the ID (428). If the face depicted in the color image matches the face depicted in the ID photo, the user (who presented the ID) is rejected as the owner of the ID (432).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for at least partially authenticating a person presenting an identification to a machine, the method comprising:
   receiving a color image and an infrared (IR) image, the IR image taken contemporaneously with the color image;
   providing a set of facial landmarks depicted in the color image;
   determining a depth value for each facial landmark in the set of color landmarks, depth values being provided from the IR image;
   determining an average depth difference based on at least a sub-set of facial landmarks in the set of facial landmarks;
   comparing the average depth difference to a difference threshold to provide a comparison; and
   selectively authenticating the person based on the comparison by at least partially authenticating the person in response to determining that an age difference exceeds a years threshold, wherein the age difference comprises one of:
      a difference between an actual age determined based on a birth date indicated in the identification and an estimated age determined from the color image, and
      a difference between an age sum and an estimated age determined from the color image, the age sum comprising a sum of an age of the identification and an estimated age determined from an image of the identification.

2. The method of claim 1, wherein providing a set of facial landmarks is executed in response to determining that a face is depicted in the color image.

3. The method of claim 1, wherein determining a depth value for each facial landmark in the set of color landmarks comprises, for each facial landmark:
   determining coordinates of the facial landmark in the color image;
   transposing the coordinates to the IR image to provide transposed coordinates; and
   assigning a depth value of the IR image at the transposed coordinates to the facial landmark.

4. The method of claim 3, wherein transposing the coordinates comprises adding at least one offset value to the coordinates.

5. The method of claim 1, wherein selectively authenticating the person based on the comparison comprises at least partially authenticating the person in response to the comparison comprising the average depth difference exceeding the difference threshold.

6. The method of claim 1, wherein determining an average depth difference comprises determining a depth difference between at least one facial landmark and an anchor facial landmark and calculating the average depth difference based on the depth difference.

7. The method of claim 6, wherein the anchor facial landmark comprises a nose tip.

8. The method of claim 1, further comprising providing the sub-set of facial landmarks by filtering at least one facial landmark having a depth value of zero from the set of facial landmarks.

9. The method of claim 1, wherein determining an average depth difference is performed in response to determining that an anchor landmark in the sub-set of facial landmarks has a non-zero depth value assigned thereto.

10. The method of claim 1, further comprising at least partially authenticating the person in response to determining that an estimated age exceeds an age verification skip threshold age.

11. A system, comprising:
one or more processors; and
a computer-readable storage device coupled to the one or more processors and having instructions stored thereon which, when executed by the one or more processors, cause the one or more processors to perform operations for at least partially authenticating a person presenting an identification to a machine, the operations comprising:
receiving a color image and an infrared (IR) image, the IR image taken contemporaneously with the color image;
providing a set of facial landmarks depicted in the color image;
determining a depth value for each facial landmark in the set of color landmarks, depth values being provided from the IR image;
determining an average depth difference based on at least a sub-set of facial landmarks in the set of facial landmarks;
comparing the average depth difference to a difference threshold to provide a comparison; and
selectively authenticating the person based on the comparison by at least partially authenticating the person in response to determining that an age difference exceeds a years threshold, wherein the age difference comprises one of:
a difference between an actual age determined based on a birth date indicated in the identification and an estimated age determined from the color image, and
a difference between an age sum and an estimated age determined from the color image, the age sum comprising a sum of an age of the identification and an estimated age determined from an image of the identification.

12. The system of claim 11, wherein providing a set of facial landmarks is executed in response to determining that a face is depicted in the color image.

13. The system of claim 11, wherein determining a depth value for each facial landmark in the set of color landmarks comprises, for each facial landmark:
determining coordinates of the facial landmark in the color image;
transposing the coordinates to the IR image to provide transposed coordinates; and
assigning a depth value of the IR image at the transposed coordinates to the facial landmark.

14. The system of claim 13, wherein transposing the coordinates comprises adding at least one offset value to the coordinates.

15. The system of claim 11, wherein selectively authenticating the person based on the comparison comprises at least partially authenticating the person in response to the comparison comprising the average depth difference exceeding the difference threshold.

16. The system of claim 11, wherein determining an average depth difference comprises determining a depth difference between at least one facial landmark and an anchor facial landmark and calculating the average depth difference based on the depth difference.

17. The system of claim 16, wherein the anchor facial landmark comprises a nose tip.

18. The system of claim 11, wherein operations further comprise providing the sub-set of facial landmarks by filtering at least one facial landmark having a depth value of zero from the set of facial landmarks.

19. The system of claim 11, wherein determining an average depth difference is performed in response to determining that an anchor landmark in the sub-set of facial landmarks has a non-zero depth value assigned thereto.

20. The system of claim 11, wherein operations further comprise at least partially authenticating the person in response to determining that an estimated age exceeds an age verification skip threshold age.

21. Non-transitory computer-readable storage media coupled to the one or more processors and having instructions stored thereon which, when executed by the one or more processors, cause the one or more processors to perform operations for at least partially authenticating a person presenting an identification to a machine, the operations comprising:
receiving a color image and an infrared (IR) image, the IR image taken contemporaneously with the color image;
providing a set of facial landmarks depicted in the color image;
determining a depth value for each facial landmark in the set of color landmarks, depth values being provided from the IR image;
determining an average depth difference based on at least a sub-set of facial landmarks in the set of facial landmarks;
comparing the average depth difference to a difference threshold to provide a comparison; and
selectively authenticating the person based on the comparison by at least partially authenticating the person in response to determining that an age difference exceeds a years threshold, wherein the age difference comprises one of:
a difference between an actual age determined based on a birth date indicated in the identification and an estimated age determined from the color image, and
a difference between an age sum and an estimated age determined from the color image, the age sum comprising a sum of an age of the identification and an estimated age determined from an image of the identification.

22. The non-transitory computer-readable storage media of claim 21, wherein providing a set of facial landmarks is executed in response to determining that a face is depicted in the color image.

23. The non-transitory computer-readable storage media of claim 21, wherein determining a depth value for each facial landmark in the set of color landmarks comprises, for each facial landmark:

determining coordinates of the facial landmark in the color image;

transposing the coordinates to the IR image to provide transposed coordinates; and assigning a depth value of the IR image at the transposed coordinates to the facial landmark.

24. The non-transitory computer-readable storage media of claim 23, wherein transposing the coordinates comprises adding at least one offset value to the coordinates.

25. The non-transitory computer-readable storage media of claim 21, wherein selectively authenticating the person based on the comparison comprises at least partially authenticating the person in response to the comparison comprising the average depth difference exceeding the difference threshold.

26. The non-transitory computer-readable storage media of claim 21, wherein determining an average depth difference comprises determining a depth difference between at least one facial landmark and an anchor facial landmark and calculating the average depth difference based on the depth difference.

27. The non-transitory computer-readable storage media of claim 26, wherein the anchor facial landmark comprises a nose tip.

28. The non-transitory computer-readable storage media of claim 21, wherein operations further comprise providing the sub-set of facial landmarks by filtering at least one facial landmark having a depth value of zero from the set of facial landmarks.

29. The non-transitory computer-readable storage media of claim 21, wherein determining an average depth difference is performed in response to determining that an anchor landmark in the sub-set of facial landmarks has a non-zero depth value assigned thereto.

30. The non-transitory computer-readable storage media of claim 21, wherein operations further comprise at least partially authenticating the person in response to determining that an estimated age exceeds an age verification skip threshold age.

* * * * *